UNITED STATES PATENT OFFICE.

NELSON H. DARTON AND DOUW D. WILLIAMSON, OF NEW YORK, N. Y.

BLEACHING, DEFECATING, AND PRESERVING SUGAR, SIRUPS, MOLASSES, CANE AND BEET-ROOT JUICES, &c.

SPECIFICATION forming part of Letters Patent No. 278,104, dated May 22, 1883.

Application filed January 11, 1883. (No specimens.)

*To all whom it may concern:*

Be it known that we, NELSON H. DARTON and DOUW D. WILLIAMSON, both of the city, county, and State of New York, have invented certain new and useful Improvements in Bleaching, Defecating, and Preserving Sugar, Sirups, Molasses, Cane and Beet-Root Juices, and in the treatment of other vegetable substances or products, of which the following is a full, clear, and exact description.

Our invention has for its object the refining, decoloring, and treating of sugar, sirups, and other saccharine and vegetable substances or products; and it more especially consists in treating the same with a solution of the tersulphite of alumina, and afterward decomposing said tersulphite with carbonic-acid gas, substantially as and with the results hereinafter described.

In treating sugars or sirups we first bring the same, in the ordinary or any suitable manner, to a solution of not over 40° Baumé. We then take a solution of the tersulphite of alumina and add the same to the sugar solution or sirup, in the proportion of about two and one-half gallons of the tersulphite to every thousand gallons of sirup, according to its strength, and thoroughly mix the whole and raise the temperature of the mixture to about 140° Fahrenheit. Any ordinary or suitable apparatus and mixer may be used for this purpose. We next pass through the mixture, while thus heated, carbonic-acid gas, which may either be taken from the products of combustion in the furnace used to raise the temperature of the sirup or sugar solution, or be generated in any well-known way. Said gas is forced by ordinary or any suitable forcing means through the mixture, and it decomposes the tersulphite of alumina, precipitating the same as carbonate of alumina, which product may be afterward utilized for any purpose that may be desired, and is new as a resultant in the treatment of sirup. A powerful or strong defecating influence on the sirup or solution is also produced in the formation or precipitation of said compound, and sulphurous acid is evolved, which bleaches the mixture, such acid being driven off by the heat to which the mixture is subjected. By this precipitation of the carbonate of alumina and the evolution of the sulphurous acid, the saccharine solution or sirup is defecated and decolored, its acidity corrected, and insoluble compounds are formed with certain coloring and similar matters. The sirups are then filtered by any suitable means, and are ready to be manipulated in the way ordinarily practiced for the manufacture of sugar, or for sale as sirups. Sirups treated as described will also keep better, the treatment tending to their preservation.

In the treatment of cane-juice about one per centum of the tersulphite of alumina will suffice. In the treatment of beet-root sugars said tersulphite serves as a substitute for that salt of lime heretofore used, and has a much better or greater defecating effect than lime. Tannin extracts may likewise be similarly treated with the tersulphite of alumina and carbonic-acid gas; but, instead of allowing the sulphurous-acid gas to pass off, it or a portion of it may be left in the liquid to preserve the tannic acid.

We may here state that when the mixture is heated the alumina separates to a small extent from its tersulphite, and by the separation the alumina tends to correct the acidity of the mixture, as also does the presence of the carbonate of alumina in the reaction.

Another advantage of our improvement is that the setting free of the alumina in the solution of saccharine substances causes the precipitation of various organic acids in the form of insoluble compounds of alumina—such as basic acetate of alumina, tartrate of alumina, &c.—and in the subsequent treatment with carbonic-acid gas, as hereinbefore described, a certain portion of the lime which was combined with said acids and set free is precipitated. In this way the saccharine solution is cleared of much organic and inorganic matter, and the yield of sugar is increased and its grain improved.

Having thus described our invention, what we claim as new, and desire to secure by Letters Patent, is—

1. The method or process herein described of defecating or defecating and decoloring sirups and other saccharine or vegetable solutions, which consists in mixing tersulphite of alumina therewith, subjecting the mixture to the action of heat, and afterward decomposing said tersulphite by passing carbonic-acid gas through the mixture, thereby causing the sulphurous acid to be evolved in the solution and carbonate of alumina to be formed or precipitated, substantially as specified.

2. In the treatment of sirups and other saccharine or vegetable solutions, subjecting the same to the joint action of carbonate of alumina and sulphurous acid, essentially as and for the purposes herein set forth.

NELSON H. DARTON.
D. D. WILLIAMSON.

Witnesses:
C. SEDGWICK,
E. M. CLARK.